(12) United States Patent
Velasco

(10) Patent No.: US 9,579,999 B2
(45) Date of Patent: Feb. 28, 2017

(54) LIGHTWEIGHT HEADREST ASSEMBLY

(71) Applicant: Howard Velasco, Bristol, CT (US)

(72) Inventor: Howard Velasco, Bristol, CT (US)

(73) Assignee: Franklin Products, Inc., Torrington, CT (US)

( * ) Notice: Subject to any disclaimer, the term of this patent is extended or adjusted under 35 U.S.C. 154(b) by 0 days.

(21) Appl. No.: 14/677,523

(22) Filed: Apr. 2, 2015

(65) Prior Publication Data

US 2015/0283927 A1  Oct. 8, 2015

Related U.S. Application Data

(60) Provisional application No. 61/974,742, filed on Apr. 3, 2014.

(51) Int. Cl.
| | |
|---|---|
| A47C 7/36 | (2006.01) |
| B60N 2/48 | (2006.01) |
| B64D 11/06 | (2006.01) |
| B60N 2/70 | (2006.01) |

(52) U.S. Cl.
CPC ......... B60N 2/4879 (2013.01); B60N 2/4802 (2013.01); B60N 2/7011 (2013.01); B64D 11/0646 (2014.12); B64D 11/0649 (2014.12); Y10T 29/49947 (2015.01)

(58) Field of Classification Search
CPC .. B60N 2/4802; B60N 2/4879; B60N 2/7011; A47C 7/38; A47C 7/383; B64D 11/0646; B64D 11/0649; Y10T 29/49947
See application file for complete search history.

(56) References Cited

U.S. PATENT DOCUMENTS

| | | | | |
|---|---|---|---|---|
| 3,029,107 | A | * | 4/1962 | Myers ................. B60N 2/4879 297/399 |
| 3,602,930 | A | * | 9/1971 | Channon ................. A47C 3/12 441/65 |
| 3,643,997 | A | * | 2/1972 | Gilbert .................. A47C 4/028 297/440.11 |
| 3,865,450 | A | * | 2/1975 | Bruenig ............... B60N 2/4802 297/397 |
| 4,067,609 | A | * | 1/1978 | Ness ...................... A47C 7/386 24/442 |
| 4,482,186 | A | * | 11/1984 | Gomes .................... A47C 4/40 16/379 |
| 5,690,387 | A | | 11/1997 | Sarti |
| 5,897,167 | A | | 4/1999 | Keith |
| 6,616,236 | B1 | * | 9/2003 | Su ............................ A47C 7/38 248/118 |
| 7,055,911 | B2 | * | 6/2006 | Simpson ................ A47C 7/282 297/440.11 |

(Continued)

OTHER PUBLICATIONS

International Search Report for PCT/US2015/032361 dated Oct. 15, 2015.

*Primary Examiner* — Philip Gabler
(74) *Attorney, Agent, or Firm* — McCormick, Paulding & Huber LLP

(57) ABSTRACT

A headrest assembly is attached to a seat back assembly by providing holes through a panel of the seat back assembly; providing loops protruding from a rear surface of the headrest assembly; inserting the loops of the headrest assembly through the corresponding holes of the seat back assembly; and inserting a retainer through the loops to fasten the headrest assembly to the seat back assembly.

18 Claims, 2 Drawing Sheets

(56) References Cited

U.S. PATENT DOCUMENTS

| | | | | |
|---|---|---|---|---|
| 7,303,232 B1* | 12/2007 | Chen | ................... | A47C 7/38 |
| | | | | 297/284.7 |
| 8,419,134 B1* | 4/2013 | Yuan | ................... | A47C 7/38 |
| | | | | 297/284.7 |
| 2005/0093356 A1* | 5/2005 | Liu | ................... | A47C 7/64 |
| | | | | 297/353 |

* cited by examiner

LIGHTWEIGHT HEADREST ASSEMBLY

CROSS REFERENCE TO RELATED APPLICATION

This application is a non-provisional of U.S. Pat. App. 61/974,742, filed Apr. 3, 2014, "Lightweight Headrest Assembly," hereby incorporated herein by reference in its entirety, and claims the benefit thereof under 35 USC §119(e).

BACKGROUND

Technical Field

The invention relates to attachment of a rigid article to a flexible support. Exemplary embodiments of the invention relate to methods and articles for attaching headrest assemblies to mesh diaphragm seat back panels.

Discussion of Art

Commercial aircraft seating is evolving to satisfy demands for greater comfort and cleaner styling within a smaller, lighter package. At the same time there is a need to reduce manufacturing and maintenance costs. The aircraft seating upholstery has a large influence on comfort, styling, weight and cost.

Commercial and residential furnishing are known that utilize woven or non-woven fabric or open-weave mesh as seating surfaces (panels). Such seating surfaces are essentially stretched diaphragms that form a suspension system between an occupant and a frame. This arrangement is becoming more common and has even been proposed for transportation applications including commercial aircraft.

Many chairs or seats have headrests that are mounted to the seat frame. In case such a frame-mounted headrest protrudes downward from the frame over a cloth or mesh diaphragm seat panel, then there is risk of damage to the seat panel by rubbing against the headrest, as the headrest typically does not move with the panel as an occupant shifts in the seat.

SUMMARY OF INVENTION

Embodiments of the invention provide modes for attaching a headrest to a seat panel, rather than to a seat frame, so as to alleviate risk of damage by rubbing of the seat panel against the headrest.

For example, embodiments of the invention provide a headrest assembly that includes a headrest frame; a pad mounted at a front surface of the headrest frame; loops protruding from a back surface of the headrest frame; and a retainer insertable through the loops for securing the headrest frame to a seat back panel.

Other embodiments of the invention provide a seat back assembly, which includes a seat back frame; a panel mounted on the frame; and a headrest attached to the panel, the headrest including a headrest frame; a pad mounted at a front surface of the headrest frame; loops protruding from a back surface of the frame through holes of the panel; and a retainer inserted through the loops for securing the headrest frame to the panel.

Yet other embodiments of the invention implement a method for attaching a headrest assembly to a seat back assembly. According to the method, a headrest assembly is attached to a seat back assembly by providing holes through a panel of the seat back assembly; providing loops protruding from a rear surface of the headrest assembly; inserting the loops of the headrest assembly through the corresponding holes of the seat back assembly; and inserting a retainer through the loops to fasten the headrest assembly to the seat back assembly.

The varied exemplary embodiments of the invention, as briefly described above, are illustrated by certain of the following figures.

DETAILED DESCRIPTION

Figure 2:
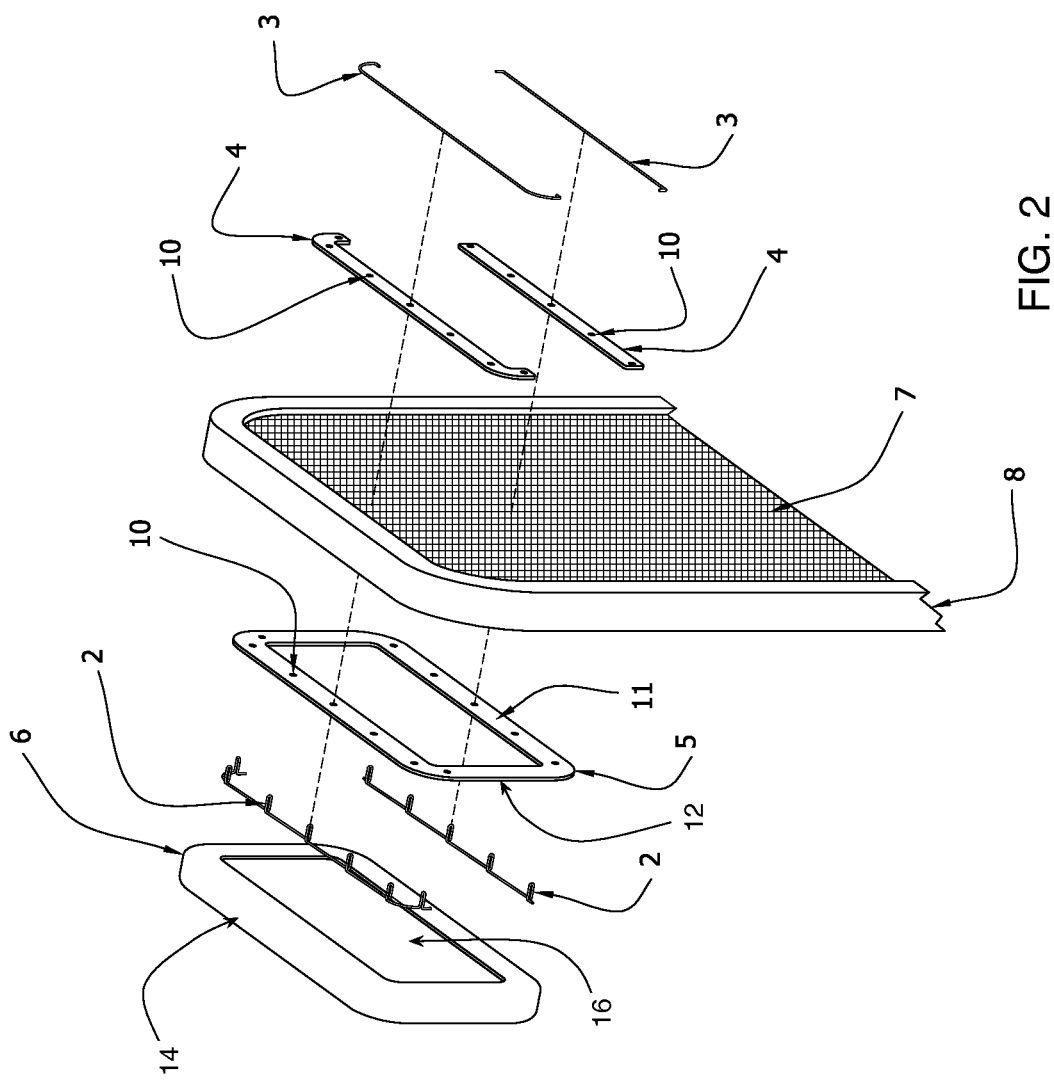
FIGS. 1-2 show a headrest assembly attached to a seat back panel, according to an embodiment of the invention.

Although embodiments of the invention are shown in the drawings and are described as relating to headrests that are attached to mesh diaphragm seat backs, aspects of the invention more generally may be applicable to headrests that are attached to lightweight solid, non-woven, or close-woven fabric seat back panels.

Figure 1:
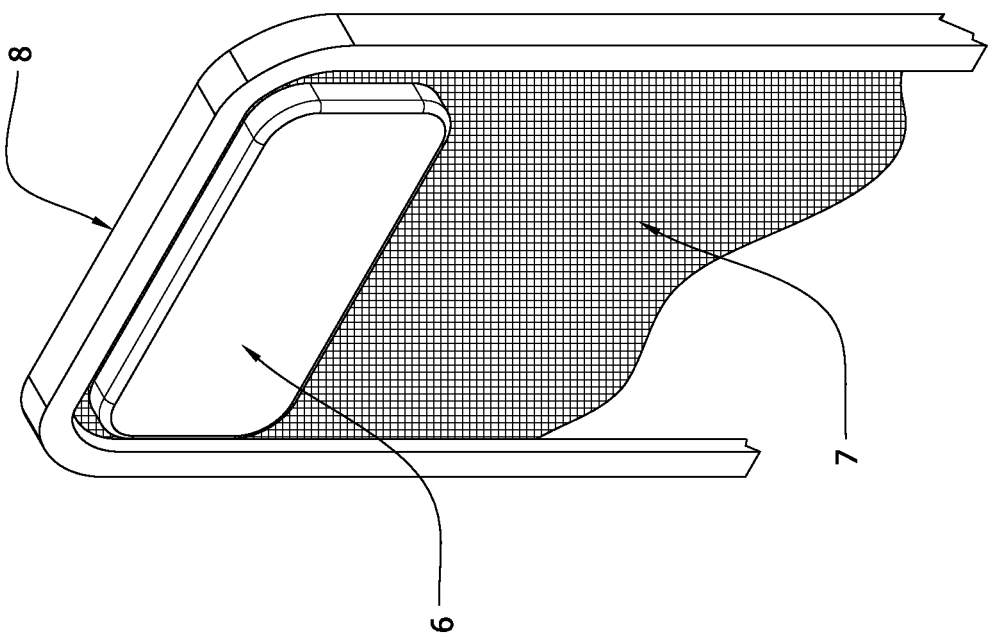

FIG. 1 shows a lightweight headrest assembly 6, which is assembled directly onto a mesh diaphragm or panel 7 that is strung across a seat back frame 8. As better shown in FIGS. 2 and 3, the headrest assembly 6 includes a headrest frame 5 to which are mounted a pad 16 and a covering 14, which are respectively secured to a front surface 12 and to a rear surface 11 of the headrest frame 5. The headrest frame 5 can be made of lightweight materials, e.g., reinforced plastic composite, molded plastic, or thin stamped metal. Wire loops 2 are mounted to protrude from the rear surface 11 of the headrest frame 5. For example, the wire loops 2 may be mounted in the headrest frame 5 by passing the loops through holes 10 and then potting the loops in place, e.g., with liquid epoxy. Alternatively, the wire loops 2 can be laid into a composite frame as it is laid up or laminated from sheets of fiber-resin composite material, or the wire loops 2 can be laid into a molded plastic frame during molding. Although the loops 2 are described as "wire," they equally can be monofilament, molded plastic, woven fabric, or any other material suitable for insertion through the panel 7 and locking engagement with a retainer 3, as further discussed below. The loops 2 can be discrete, or they can be integrally formed in one or more filaments that are laid onto the front surface 12 or among layers of a laminated frame 5.

When the headrest assembly 6 is installed onto a front surface of the mesh panel 7, the wire loops 2 protrude from the headrest frame 5 back surface 11, through the mesh panel 7. A backing plate 4 is placed against the back surface of the mesh panel 7 so that holes 10, formed in the backing plate 4, receive the wire loops 2. The wire loops 2 project through the holes 10 so that a wire retainer 3 (which may comprise multiple discrete pieces of wire) can be threaded through the loops 2. Ends of the wire retainer 3 then are bent to retain the wire in the loops 2, thereby locking the backing plate 4 and the headrest frame 5 together onto the mesh panel 7.

The headrest frame 5 and the backing plate 4 can be made flexible to bend as the mesh panel 7 is deflected by weight of the seat occupant. Also, the headrest assembly 6 can be made to have a curved (non-planar, e.g., cylindrical, conical, or toroidal) shape so that when it is installed the seat back panel 7 will be held in a corresponding shape. This provides a way to enhance the natural bolstering effect of the diaphragm panel 7, without complicating the shape of the seat frame 8.

Figure 3:
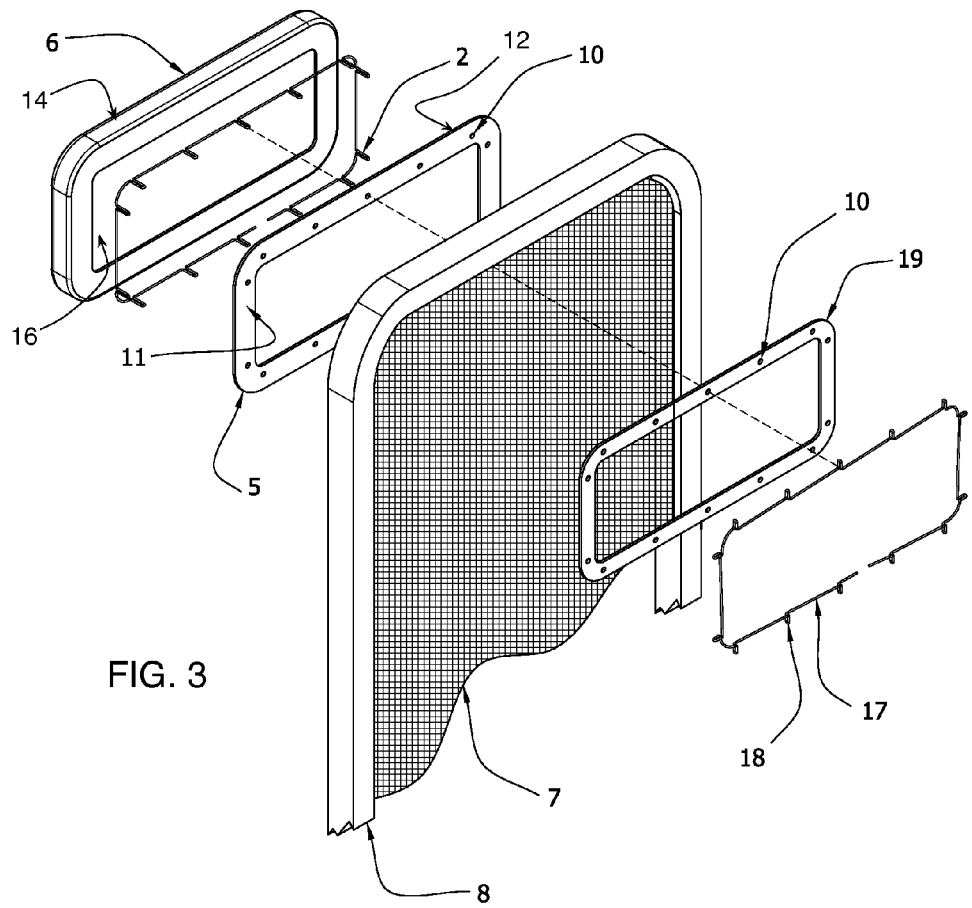
FIGS. 3-5 show the headrest assembly of FIGS. 1-2 attached to a seat back panel, according to other embodiments of the invention.
Figure 4:
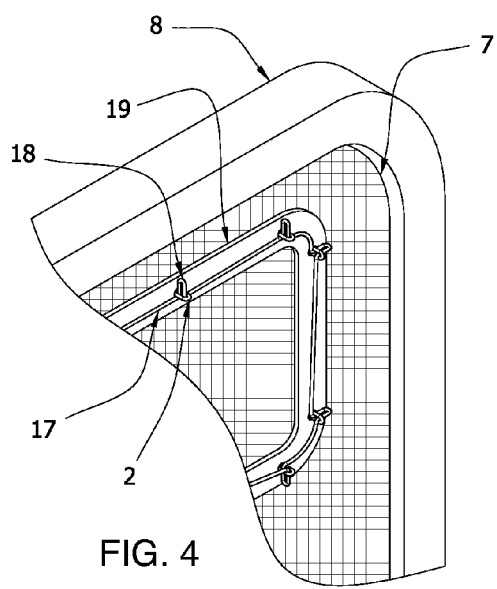
Figure 5:
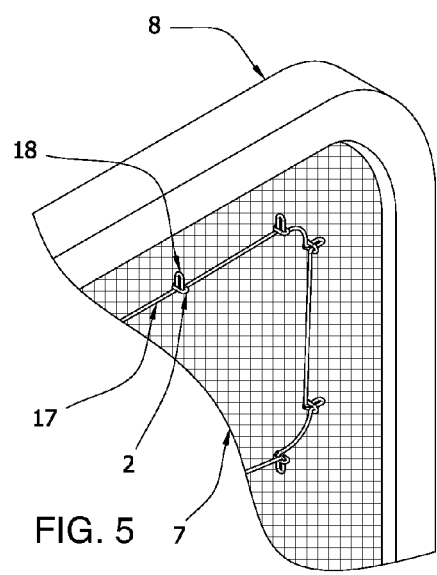

As an alternative to the wire retainer 3, FIGS. 3-5 show a quick release (loop) retainer 17, which includes tabs 18 that can be engaged with the wire loops 2 so as to lock together the headrest frame 5 with a backing plate 19 (which can be made in one or several pieces). For ease and security of installation, the quick release retainer 17 can be made of spring tempered stainless steel wire in a ring-shaped configuration, with the tabs 18 protruding outward from the ring. The wire loops 2 then are disposed on the headrest frame 5 in complementary fashion, with the openings of the wire loops directed inwardly so as to receive the tabs 18. In other words, the retainer 17 is in a loop form with the tabs 18 projecting outward, and the wire loops 2 are disposed about a closed shape that matches the loop form of the retainer 17, with their openings facing toward the center of the closed shape for receiving the projecting tabs 18. This combination of material and geometry averts any tendency for the tabs 18 to slip out of the loops 2, but permits easy removal of the headrest assembly 6 from the mesh panel 7 by pulling on the straight sections of the retainer 17 so as to disengage the tabs 18 from out of the wire loops 2.

Although the headrest assembly 6 is particularly adapted for attachment to the relatively light mesh diaphragm 7, it also can be attached to other types (solid, non-woven, or tight woven fabric) seat back pans by inserting the wire loops 2 through holes or grommets preformed in the seat back pan, or through holes of a relatively heavier mesh diaphragm, in which cases, the backing plate 4 or 19 can be omitted as shown in FIG. 5.

The front padding 16 can be made by molding, die cutting, compression cutting, or cutting segments from a contoured strip. Fireblocked high resilient foam can be used in place of the flame resistant foam. A laminated pad type dress cover can replace the foam construction as padding. The headrest frame 5 and backing plate 4 can be made with an abrasive waterjet cutting the shape of the frame from sheets of plastic or reinforced plastic composite.

Although exemplary embodiments of the invention have been described with reference to attached drawings, those skilled in the art nevertheless will apprehend variations in form or detail that are consistent with the scope of the invention as defined by the appended claims.

What is claimed is:

1. A headrest assembly comprising:
   a headrest frame;
   a pad mounted at a front surface of the headrest frame;
   loops protruding from a back surface of the headrest frame and insertable through openings in a seat back panel, each of said loops defining a loop opening; and
   a retainer insertable through the loops for securing the headrest frame to the seat back panel,
   wherein the retainer is in a loop form with projecting tabs, and wherein the loops comprise a circumferential array of loops disposed about the circumference of a closed shape that matches the loop form of the retainer such that the loops project in a direction normal to the retainer with the openings of the loops facing inwardly toward the axial center of the closed shape for receiving the projecting tabs of the retainer.

2. The headrest assembly of claim 1 further comprising a backing plate that has holes for insertion of the loops, the retainer insertable through the loops for securing the backing plate to the headrest frame.

3. The headrest assembly of claim 2 wherein the backing plate is made in plural pieces.

4. The headrest assembly of claim 1 wherein the loops are laid into the headrest frame as the frame is laid up from fiber-resin composite sheets or molded from plastic.

5. The headrest assembly of claim 1 wherein the loops are arranged with their openings defining a bent pathway for insertion of the retainer.

6. The headrest assembly of claim 1 wherein the loops are wire or monofilament.

7. The headrest assembly of claim 1 wherein the headrest frame is formed in a cylindrical, conical, or toroidal shape.

8. A seat back assembly comprising:
   a seat back frame;
   a panel mounted on the frame; and
   a headrest attached to the panel, the headrest including a headrest frame; a pad mounted at a front surface of the headrest frame; loops protruding from a back surface of the frame through holes of the panel, each of said loops defining a loop opening; and a retainer inserted through the loops for securing the headrest frame to the panel,
   wherein the retainer is in a loop form with projecting tabs, and wherein the loops comprise a circumferential array of loops disposed about the circumference of a closed shape that matches the loop form of the retainer such that the loops project in a direction normal to the retainer with the openings of the loops facing inwardly toward the axial center of the closed shape for receiving the projecting tabs of the retainer.

9. The seat back assembly of claim 8 further comprising a backing plate that has holes for insertion of the loops, the retainer insertable through the loops for securing the backing plate to the headrest frame.

10. The seat back assembly of claim 9 wherein the backing plate is made in plural pieces.

11. The seat back assembly of claim 8 wherein the loops are laid into the headrest frame as the frame is laid up from fiber-resin composite sheets or molded from plastic.

12. The seat back assembly of claim 8 wherein the loops are arranged with their openings defining a bent pathway for insertion of the retainer.

13. The seat back assembly of claim 8 wherein the panel is a mesh diaphragm.

14. The seat back assembly of claim 8 wherein the loops are inserted through grommets provided in the panel.

15. The seat back assembly of claim 8 wherein the loops are wire or monofilament.

16. The seat back assembly of claim 8 wherein the headrest frame is formed in a cylindrical, conical, or toroidal shape.

17. A method for attaching a headrest assembly to a seat back assembly, comprising:
   providing holes through a panel of the seat back assembly;
   providing loops protruding from a rear surface of the headrest assembly, each of said loops defining a loop opening;
   inserting the loops of the headrest assembly through the corresponding holes of the seat back assembly; and
   inserting a retainer through the loops to fasten the headrest assembly to the seat back assembly;
   wherein the retainer is in a loop form with projecting tabs, and wherein the loops comprise a circumferential array of loops disposed about the circumference of a closed shape that matches the loop form of the retainer such that the loops project in a direction normal to the retainer with the openings of the loops facing inwardly toward the axial center of the closed shape for receiving the projecting tabs of the retainer.

18. The method of claim 17 further comprising, before inserting the retainer through the loops, inserting the loops through holes of a backing plate that the retainer then locks to the seat back panel and to the headrest assembly.

* * * * *